United States Patent [19]

Schweikl et al.

[11] Patent Number: 4,552,509
[45] Date of Patent: Nov. 12, 1985

[54] ARRANGEMENT FOR JOINING TWO RELATIVELY ROTATABLE TURBOMACHINE COMPONENTS

[75] Inventors: Ludwig Schweikl, Moosburg; Horst Weiss, Seefeld; Friedrich Sippel, Stein, all of Fed. Rep. of Germany

[73] Assignee: Motoren-und Turbinen-Union Munchen GmbH, Munich, Fed. Rep. of Germany

[21] Appl. No.: 229,427

[22] Filed: Jan. 29, 1981

[30] Foreign Application Priority Data

Jan. 31, 1980 [DE] Fed. Rep. of Germany ....... 3003469

[51] Int. Cl.⁴ .............................................. F01D 25/26
[52] U.S. Cl. ...................................... 415/135; 415/175
[58] Field of Search ............... 415/115, 134, 135, 136, 415/137, 138, 140, 178, 108, 175

[56] References Cited

U.S. PATENT DOCUMENTS

| 2,609,176 | 9/1952 | Purvis | 415/138 |
| 3,075,744 | 1/1963 | Peterson | 415/137 X |
| 3,262,635 | 7/1966 | Smuland | 415/138 X |
| 3,443,791 | 5/1969 | Sevetz et al. | 415/115 |
| 3,857,649 | 12/1974 | Schaller et al. | 415/137 X |
| 3,989,410 | 11/1976 | Ferrari | 415/175 X |
| 4,025,226 | 5/1977 | Hovan | 415/115 |

FOREIGN PATENT DOCUMENTS 0147194 10/1961 U.S.S.R. ............................ 415/138

Primary Examiner—Philip R. Coe
Assistant Examiner—Frankie L. Stinson
Attorney, Agent, or Firm—Alan H. Levine

[57] ABSTRACT

Two rotationally symmetrically correlated components of a turbomachine, such as a gas turbine engine, define between them an air duct surrounding the axis of the components. A resilient band-like wall section extending radially from the first component bears resiliently in an axial direction against a wall section projecting radially from the second component to provide a seal for the duct. Another wall section of each component cooperate to form a radially extending tongue-in-groove joint, which may incorporate another seal for the duct, this joint permitting relative axial and radial movements between the two components. Means may be provided to maintain the fluid pressure within the duct higher than the pressure exterior thereto. The two components may be joined together by a bayonet-type connection. One of the components may comprise two members so that the member carrying part of the bayonet-type connection can be rotated with respect to the other member during assembly of the two components. One of the components may form part of the turbine casing or part of a turbine nozzle, the cooling channels of the nozzle vanes communicating with the air duct. At least some of the abuting surfaces of the cooperating wall sections may be provided with abraidable coatings, and some may be provided with wear-inhibiting coatings.

14 Claims, 5 Drawing Figures

ARRANGEMENT FOR JOINING TWO RELATIVELY ROTATABLE TURBOMACHINE COMPONENTS

This invention relates to means for joining together rotationally symmetrically correlated turbomachine components, especially of gas turbine engines, exposed to dissimilar thermal effects. More particularly, the invention relates to joining components which are mated to form an air duct extending coaxially to the centerline of the turbomachine and sealed off from the local environment or from other intermediate spaces necessitated by and incorporated into the structure of the turbomachine. In such machines, the lateral walls of the duct are formed essentially by radially projecting wall sections of the mated components, the wall sections at least partially engaging one with the other via tongue-in-groove joints.

It has been proposed to insert a radially resilient piston ring in a circumferential slot of a radially extending wall section of a first component, the outer circumferential surface of the ring bearing, for sealing purposes, against the adjacent wall section of a second component. This arrangement causes assembling difficulties due to the fact that the adjacent wall section of the second component must be centered on the associated wall section of the first component, while overcoming the spring action of the piston ring, thereby necessitating the use of additional tools.

A further disadvantage encumbering this known arrangement results from the inadequate sealing action of the piston ring, because the piston ring is incapable of satisfactorily compensating for manufacturing tolerances. Consequently, gaps of various sizes remaining between the outer circumferential surface of the piston ring and the adjacent wall portion of the second component may allow leakage of air which is then lost for turbine cooling or similar applications. Furthermore, this previously proposed arrangement has not been satisfactory with regard to compensation for unlike thermal loads and distortions of the two components while in service.

It is a broad object of the present invention to eliminate these problems and disadvantages associated with the known arrangement and to advantageously improve the joining means such that assembly and disassembly of the mated components is relatively simple, while at the same time the sealing effect is optimum despite the dissimilar thermal loads imposed on the two mated components.

The invention is described more fully with reference to the accompanying drawings, in which.

Figure 1:
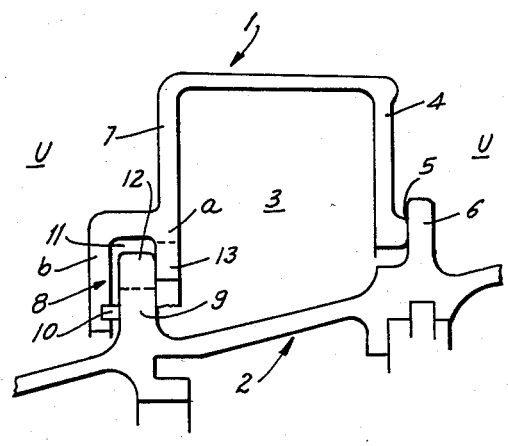
FIG. 1 is an axial cross-sectional view illustrating a first embodiment of a component joint for an annular duct.

FIG. 1 illustrates means for joining rotationally symmetrically correlated gas turbine engine components 1 and 2 exposed to dissimilar thermal effects. The joined-together components form an air duct 3 which extends coaxially to the centerline of the engine and which is sealed off from the local environment or from other intermediate spaces U necessitated by and incorporated into the structure of the machine.

A radially extending wall section 4 of the first component 1 has the form of an integral resilient band which, in its axially prestressed condition and for sealing purposes, bears with its abutment face 5 against a radially extending wall section 6 of the second component 2. The second component 2, for example, forms part of the outer turbine casing of the gas turbine engine.

The remaining wall section of the first component 1 cooperates with the remaining wall section 9 of the second component 2, by means of a tongue-in-groove joint 8, to provide a suspension allowing locally restricted radial and axial movement. A structural, centrally and circumferentially locating joint, omitted in the drawing, is provided between one or the other cooperating wall sections 4 and 6 or 7 and 9.

In order to assist the sealing spring action provided by the wall section 4, the air pressure prevailing in the air duct 3, formed by the two components 1 and 2, is advantageously maintained, when the engine is running, higher than the air or gas pressure prevailing outside the air duct 3 immediately behind the wall section 4 in the intermediate space U. In order to compensate for relatively liberal manufacturing tolerances the air duct 3, formed by the two components 1 and 2, is sealed off from the local environment U by intervening seals, such as a sealing ring 10 between the cooperating wall sections 7 and 9.

With continued reference to FIG. 1, the first and the second components 1 and 2 are located one against the other, or are joined together, by means of a bayonet-type joint. For this purpose, the nonresilient wall section 7 of the first component 1 is formed with a circumferential slot 11, surrounded by bracket portions a and b, receiving at least partially a radially projecting wall section 9 of the second component 2. To achieve a bayonet-type joint, the wall section 9 has preferably circumferentially equally spaced recesses 12. These recesses correspond to circumferentially similarly spaced serrations 13 of the inner bracket portion a of the wall section 7. During assembly, the first component 1 is inserted with its serrations 13 through the recesses 12 and is then twisted circumferentially until it is prevented by wall section 9 from springing back because the serrations 13 are bearing against the lands remaining between the recesses 12 of the wall section 9.

Figure 2:
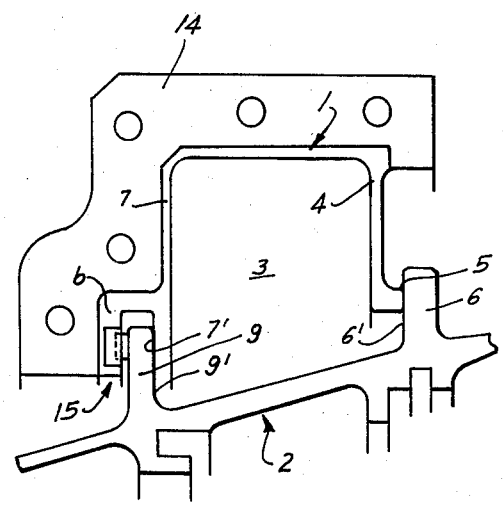
FIG. 2 is an axial cross-sectional view of a second embodiment of a component joint for an annular duct consisting of two halves bolted together.

Using the same reference numerals for essentially unchanged components, FIG. 2 mainly departs from FIG. 1 in that the air duct 3 formed by the components 1 and 2 is composed of two semicircular halves joined together. A connecting flange used for the purpose is indicated by the numeral 14. A structural, centrally and circumferentially locating joint 15 is formed between the left-hand bracket portion b of the wall section 7 and, cooperating therewith, the wall section 9 of the second component 2. Specifically, bracket portion b is formed with a series of recesses uniformly spaced apart in the circumferential direction, the recesses being engaged by teeth projecting from wall section 9. During assembly, the resilient wall section 4 is urged back, using a suitable fixture, to permit each half of a first component 1 to be mounted and centrally located from above in a relatively simple fashion on to the wall section 9 of the respective second component 2. In order to bridge and seal the circumferential abutting faces, the two halves of the wall sections 4 can be sealed using metal strips that engage one with the other at these faces.

Figure 3:
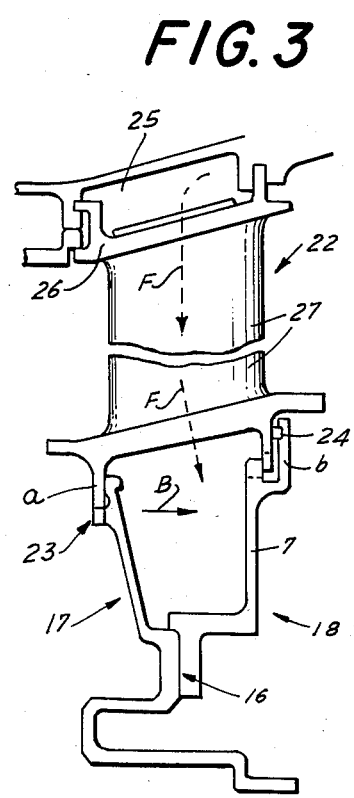
FIG. 3 is an axial cross-sectional view illustrating a further embodiment of a component joint forming the suspension for turbine nozzle vanes in a gas turbine engine.

With reference now to FIG. 3, the first component consists of two turbine stator members 17 and 18 joined together by means of a flanged, separable joint 16. Member 17 is provided with a resilient wall section 4 and member 18 is provided with a wall section 7 containing part of the bayonet-type fitting. By means of the flanged connection 16, the wall section 7 can be twisted circumferentially and can be located in various circumferential positions against the second stator member 17 by taking advantage of the recess and serration spacing of the bayonet-type connection.

Figure 4:
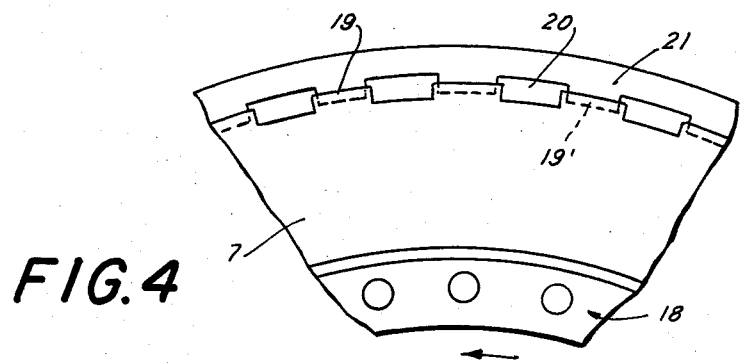
FIG. 4 is a view, looking in the direction of arrow B in FIG. 3, illustrating details of a bayonet-type suspension.

As will become apparent from FIG. 4, the wall section 7 presents a number of circumferentially equally spaced serrations 19 by which it is inserted in a first position on the stator member 17 through recesses 20. Recesses 20 are located in a root-end wall section 21 of a second member, which here takes the shape of a complete turbine nozzle 22 (FIG. 3). The wall section 7 is inserted against the spring action of the axially preloaded wall section 4 of the stator member 17. Immediately upon the insertion process just described, the flanged connection is separated and the stator member 18 is twisted circumferentially such that the serrations 19 are urged against the flank-shaped portions 19' of the wall section 21 under the action of the pretensioned wall section 4. In this circumferential position, the stator member 18 is again located using the flanged connection 16.

The locating provision 23 (FIG. 3) additionally enables the turbine nozzle 22 to be simply and rapidly anchored to the stator member 17. This locating provision, similar to the embodiment of FIG. 2, involves a series of recesses in wall portion a and a series of cooperating teeth in wall section 4. The numeral 24 indicates a sealing ring arranged between the wall section 21 and the outer bracket portion b of the wall section 7.

Using an outer annular duct 25, formed between outer portions of the casing and the outer vane shroud 26, the incoming cooling air can be delivered in the direction of arrows F through the cavities or cooling ducts of the nozzle vanes 27 and into the annular duct 3. In a manner not shown in the drawing, this cooling air can be exhausted from the annular duct 3 through ports and then ducted away for cooling or sealing purposes.

Figure 5:
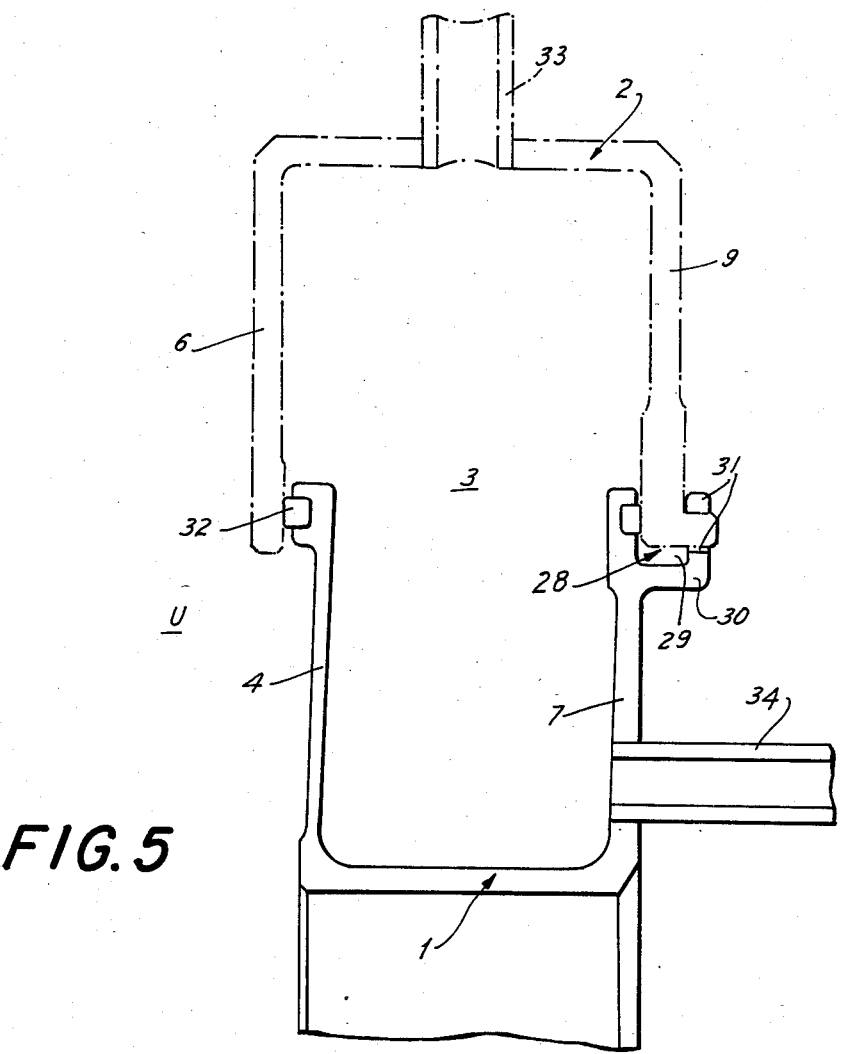
FIG. 5 is an axial cross-sectional view illustrating a third embodiment of a component joint for an annular duct.

Using the same reference numerals for practically unchanged components as illustrated in FIGS. 1 and 2, FIG. 5 shows an embodiment having a circumferentially extending slot 29 at the extreme end of the non-resilient wall section 7 of the first component 1. The slot forms part of a connection 28 which ensures centrally and circumferentially locating suspension that permits locally limited radial and axial movement. Projecting into the slot 29 from above is the end of the radially projecting wall section 9 of the second component 2. A bracketing shoulder 30 on wall section 7 which partially defines the circumferential slot 29 is provided with preferably circumferentially equally spaced recesses 31 projecting into which are axially bent ends of the wall section 9.

Arranged in the wider end of the resilient wall section 4, illustrated in FIG. 5, is a sealing ring bearing upon the suitably oriented abutment face of the wall section 6. In the present case, the wall section 4 does not perform a centrally locating function, as does the wall section 4 of FIGS. 2 and 3, and therefore wall section 4 can be made accordingly slim. This also promotes the sealing action. Pipes 33 and 34 serve to deliver pressurized air to, or carry it away from, the air duct 3.

As will become apparent from FIG. 2, the metallic abutment faces 5 and 7' of the wall sections 4 and 7, respectively, could be manufactured with a great degree of precision. Allowing for manufacturing tolerances along the faces 6' and 9' of the wall sections 6 and 9, respectively, it may therefore be helpful to provide the operationally cooperating abutment faces of the wall sections 6 and 4 or 9 and 7, or at least 6' and 9' of component 2, with abraidable coatings. It is anticipated that in operation the abutment surfaces 5 and 7' work more or less deeply into the abraidable coatings on the faces 6' and 9' to compensate for any inconsistent tolerances. The abraidable coatings are deposited on the metallic surfaces by plasma spraying, and they each consist essentially of three constituents, i.e., Ni-Cr-iron, boron nitride, and aluminium (thickness of coating about 1 mm, for thermal applications up to about 800° C).

The operationally cooperating abutment faces of the respective wall portions, or at least those of one of the two components, can be provided with wear inhibiting coatings deposited by thermal spraying or electroplating processes. The thermal spraying process used could be plasma spraying or flame shock spraying. In the case of plasma spraying, chromium carbide ($Cr_3C_2$) or other embedding powders are used on the friction surfaces involved, whereas in the case of flame shock spraying, tungsten cobalt or other coatings are deposited on the friction or abutment faces. For chromium carbide embedding powder, a coating thickness of about 0.3 mm and a temperature range of about 800° C. max. would be assumed. The tungsten carbide/cobalt coatings could be deposited for an 0.07 to 0.1 mm thickness of coating, assuming a service temperature of about 550° C. max. Useful for deposition by the electroplating process on to the friction or abutment faces, as wear inhibiting coatings, would be nickel, chromium, silver, or other materials. It is important to use wear inhibiting coatings only where the manufacturing tolerances between the mated components are relatively moderate; otherwise, sealing by a sealing ring would be the preferred practice.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. An arrangement for joining two rotationally symmetrically correlated turbomachine components which are subjected to dissimilar thermal effects, the components defining between them an air duct surrounding the axis of the components, comprising:
   (a) a resilient band-like wall section extending radially from a first component,
   (b) a wall section projecting radially from a second component, the resilient wall section bearing resiliently in an axial direction against the second component wall section to provide a seal for the air duct, (c) another wall section of the first component and another wall section of the second component cooperating to form a radially extending tongue-in-groove joint coaxial with the two components, the tongue of the joint fitting loosely enough in the groove of the joint to permit relative axial and radial movement between the two components, and (d) a bayonet-type connection between one of the cooperating pairs of wall sections of the two components, the connection permitting axial movement between the two components, to effect assembly thereof, when the components are in one relative circumferential orientation, and the connection preventing axial disassembly movement between the components when they are in a different relative circumferential orientation.

2. An arrangement as defined in claim 1 including means for maintaining the fluid pressure in the air duct higher than the pressure on the side of the resilient wall section external to the duct.

3. An arrangement as defined in claim 1 or 2 including sealing means between the other wall section of the first component and the other wall section of the second component providing another seal for the air duct.

4. An arrangement as defined in claim 1 wherein one side of the groove of the tongue-in-groove joint is formed with circumferentially equally spaced recesses extending to the free edge of that side, and the tongue is formed with axially directed ends accommodated within the recesses.

5. An arrangement as defined in claim 1 wherein the bayonet-type connection includes circumferentially spaced recesses in the tongue of the tongue-in-groove joint, and cooperable serrations in one side of the groove of that joint, whereby when assembling the two components the serrations are inserted into the recesses after which the two components are relatively twisted in a circumferential direction to secure the parts together.

6. An arrangement as defined in claim 5 wherein the first component includes two members joined together by a separable flanged connection, one of the members carrying the resilient wall section and the other member carrying the other wall section of the first component, the other wall section having part of the bayonet-type connection, the flange connection permitting twisting of said other member with respect to said one member so as to operate the bayonet-type joint.

7. An arrangement as defined in claim 1 wherein the second component forms part of the turbine casing of the turbomachine.

8. An arrangement as defined in claim 1 wherein the second component forms part of a turbine nozzle extending coaxial with the two components, the nozzle having vanes provided with cooling channels, the cooling channels communicating with the air duct defined by the two components.

9. An arrangement as defined in claim 1 wherein at least some of the abuting surfaces of the cooperating wall sections of the two components are provided with abraidable coatings.

10. An arrangement as defined in claim 9 wherein the abraidable coatings include Ni-Cr-iron, boron nitride, and aluminium, and are applied to the surfaces by plasma spraying.

11. An arrangement as defined in claim 1 wherein at least some of the abuting surfaces of the cooperating wall sections of the two components are provided with wear-inhibiting coatings.

12. An arrangement as defined in claim 11 wherein the wear-inhibiting coatings are chromium carbide applied by thermal spraying using a plasma spraying process.

13. An arrangement as defined in claim 11 wherein the wear-inhibiting coatings are carbide/cobalt deposited by a flame shock spraying process.

14. An arrangement as defined in claim 11 wherein the wear-inhibiting coatings are nickel, chromium, or silver deposited by an electroplating process.

* * * * *